United States Patent
Van Schaik et al.

(10) Patent No.: US 9,073,572 B2
(45) Date of Patent: Jul. 7, 2015

(54) RETENTION BRACKET FOR STEERING COLUMN MEMBER

(71) Applicant: Van-Rob Inc., Aurora (CA)

(72) Inventors: Lambertus S. Van Schaik, Pickering (CA); Wayne Wing Chun Wong, Richmond Hill (CA)

( * ) Notice: Subject to any disclaimer, the term of this patent is extended or adjusted under 35 U.S.C. 154(b) by 99 days.

(21) Appl. No.: 14/086,081

(22) Filed: Nov. 21, 2013

(65) Prior Publication Data

US 2015/0136925 A1 May 21, 2015

(51) Int. Cl.
*F16M 11/00* (2006.01)
*B62D 1/16* (2006.01)
*F16M 13/02* (2006.01)

(52) U.S. Cl.
CPC . *B62D 1/16* (2013.01); *F16M 13/02* (2013.01)

(58) Field of Classification Search
CPC .................................. B62D 1/16; F16M 13/02
USPC ................................... 248/200, 205.1, 231.91
See application file for complete search history.

(56) References Cited

U.S. PATENT DOCUMENTS

| | | | | |
|---|---|---|---|---|
| 4,000,876 A | * | 1/1977 | Usui et al. | 248/205.1 |
| 5,025,679 A | * | 6/1991 | Yamamoto | 74/493 |
| 5,868,426 A | * | 2/1999 | Edwards et al. | 280/779 |
| 6,036,228 A | * | 3/2000 | Olgren et al. | 280/775 |
| 6,450,533 B1 | * | 9/2002 | Kimura et al. | 280/779 |
| 6,644,690 B2 | * | 11/2003 | Brownlee et al. | 280/779 |
| 7,861,615 B2 | * | 1/2011 | Harris et al. | 74/493 |
| 8,029,045 B2 | | 10/2011 | Merkle et al. | |
| 8,459,697 B2 | * | 6/2013 | Zornack et al. | 280/779 |
| 2005/0093285 A1 | * | 5/2005 | Lee et al. | 280/779 |
| 2014/0346761 A1 | * | 11/2014 | Schnitzer | 280/779 |

FOREIGN PATENT DOCUMENTS

| | | |
|---|---|---|
| DE | 42 32 846 A1 | 3/1994 |
| EP | 1 142 772 A1 | 10/2001 |
| EP | 2 436 579 A2 | 4/2012 |
| JP | H08 183462 A | 7/1996 |

* cited by examiner

*Primary Examiner* — Mark Wendell (57) ABSTRACT

There is provided in a preferred embodiment a retention bracket for coupling a steering column member to a vehicle cross-support member. The bracket includes a mounting shoe and a reinforcing rod. The mounting shoe has gusset plates integrally joined by a forward end plate, and a lowermost flange extending inwardly along a bottom edge portion of one gusset plate towards the other gusset plate to define a lowermost channel. The reinforcing rod includes an elongated reinforcement portion and a threaded bored portion, the reinforcing rod being positioned in the channel with an outer peripheral surface coupled to the flange and the other gusset plate. The threaded bore portion defines an internally threaded bore for complementary mated engagement with a threaded end of an attachment bolt in the securement of the steering column member to the retention bracket.

24 Claims, 8 Drawing Sheets

RETENTION BRACKET FOR STEERING COLUMN MEMBER

FIELD OF THE INVENTION

This invention relates to a retention bracket for coupling or securing an object to another object at a mounting location, or most preferably a steering column member to a vehicle cross-support member. The invention further relates to a vehicle steering wheel arrangement which includes a plurality of retention bracket coupled to mounting locations provided on a vehicle cross-support member.

BACKGROUND OF THE INVENTION

In the automobile industry, vehicle cross-support members, crossbeams, cross car beams, and other similar components (collectively referred hereinafter as "vehicle cross-support members" or "cross-support members") are utilized as part of the vehicular body structure. The vehicle cross-support member normally spans between or fastened to a pair of laterally disposed vertical pillars, or A-pillars, in the region below the windscreen, and between a forward engine compartment and a rearward passenger compartment, so as to extend in a direction transverse to the length of an automobile. As part of a motor vehicle body, the cross-support member provides for cross car stiffness and rigidity against for example side load impacts.

Located forwardly of the driver and the front-row passenger, the cross-support member also supports or provides mounting surfaces for various vehicle components, including an instrument panel, a glove and/or storage compartment, a center console, a dashboard and a steering column member. Although direct attachment may be possible, various attachment devices or assemblies could be utilized on the cross-support member to effect attachment of such vehicle components. The attachment devices and assemblies are preferably designed such that the noise and vibrations transferring from the vehicle engine, drivetrain, transmission or any other moving parts are reduced for optimal passenger comfort. Reduction of weight and production costs are also of important consideration in designing such attachment devices and assemblies.

A number of attachment assemblies for attaching the steering column member to the cross-support member are known. U.S. Pat. No. 8,029,045 to Merkle discloses an integrated cross-support member design having an attachment device of a three-dimensional ribbed structure fastened to a crossbeam body. The attachment device of Merkle includes a plurality of vertically oriented blanks coupled to the crossbeam body in a distributed, side-by-side manner over a partial length thereof, and in an orientation extending transverse to the longitudinal axis of the crossbeam body to form a ribbed structure. Merkle describes that the ribbed structure provides multiple mounting locations for attachment elements, such as bushes and threaded pins, for attaching a vehicle component or a steering column to the crossbeam body. Specifically, Merkle describes that the attachment elements are coupled to two adjacent blanks in the gap between the blanks. Merkle further provides that for rigidity and stiffness, a bracing bar and rigid linking elements (to connect free ends of adjacent blanks) could be utilized.

Merkle suggests that such arrangements provide for improved stiffness and strength, as well as improved maximum mechanical load which may be placed on the attachment device. Merkle further suggests that the open structure of the attachment device allows for improved weight reduction, when compared to other known devices incorporating a closed structure.

It is believed that the attachment device of Merkle may suffer the disadvantages in that the individual blanks could be prone to transferring noise and vibrations from the engine compartment to the driver and the passenger compartment. Furthermore, the use of multiple blanks which must be fastened individually to the crossbeam body may require greater fabrication precision, and involve greater complexity and manufacturing costs. The vertically oriented blanks may also pose a serious safety concern for the driver, especially in the context of a head-on collision at higher speeds.

SUMMARY OF THE INVENTION

One possible non-limiting object of the present invention is to provide a retention bracket for coupling a steering column member to a cross-support member, and which is for improving noise, vibration and harshness ("NVH") performance.

Another possible non-limiting object of the present invention is to provide a retention bracket for coupling a vehicle steering column member to a vehicle cross-support member, and which is for improving distribution of mechanical load, and for withstanding torsional moments generated by the steering column member.

Another possible non-limiting object of the present invention is to provide a retention bracket which allows for reduced manufacturing costs and simpler installation and design as a single pre-formed integral unit.

Another possible non-limiting object of the present invention is to provide a retention bracket which broadly permits improved and more stable coupling of an object to another object at a mounting location.

In view of the disadvantages of previously known devices, the present invention provides in one simplified aspect a retention bracket having a mounting shoe and a reinforcing rod, and which in a most preferred embodiment, is for coupling a steering column member to a vehicle cross-support member.

In another aspect, the present invention provides a retention bracket for coupling a steering column member to a vehicle cross-support member, the cross-support member defining a mounting location having a downwardly oriented mounting surface disposed adjacent to and above a forwardly oriented mounting surface, the forwardly oriented mounting surface defining an aperture, the retention bracket comprising a mounting shoe and an axially extended reinforcing rod mechanically engageable by a threaded end of an attachment bolt in the securement of the steering column member to the retention bracket, wherein the mounting shoe comprises: a pair of laterally spaced gusset plates, each said gusset plate extending forwardly from a respective rear edge, and being integrally joined at respective forward portions by a forward end plate to define an open interior therebetween, wherein an upper edge of at least one of the gusset plates and the forward end plate is positionable in substantially abutting contact with the downwardly oriented mounting surface, and at least one of the rear edges is positionable in substantially abutting contact with the forwardly oriented mounting surface; and a lowermost flange extending inwardly along a bottom edge portion of a first one of the gusset plates towards the second other gusset plate to define a lowermost channel therebetween; and the reinforcing rod comprises at least one elongated reinforcement portion and a threaded bore portion, the threaded bore portion defining an internally threaded bore, wherein the reinforcing rod is positioned in the lowermost channel with an outer peripheral surface of the reinforcing rod being coupled to an inner end of the lowermost flange and a bottom edge of the second gusset plate; and wherein the threaded end of the attachment bolt is receivable through the aperture for complementary mated engagement with the internally threaded bore.

In yet another aspect, the present invention provides a retention bracket for securing a first object to a second object, the second object defining a mounting location having a first generally planar mounting surface oriented at an acute, right or obtuse angle to a second generally planar mounting surface, wherein the second mounting surface defines an aperture, the retention bracket comprising a mounting shoe and an axially extended reinforcing rod mechanically engageable by an attachment bolt in the securement of the first object to the retention bracket, wherein the mounting shoe comprises: a pair of laterally spaced plates integrally joined along associated first ends by an end wall to define an open interior therebetween, wherein at least one of second other ends of the plates are positionable in substantially abutting contact with the second mounting surface, and at least one of first edges of the plates are positionable in substantially abutting contact with the first mounting surface; and at least one flange extending inwardly from a second other edge of a first one of the plates towards a second other edge of the second other plate to define a rod receiving channel therebetween; and the reinforcing rod comprises at least one elongated reinforcement portion and a bolt engagement portion, the bolt engagement portion defining an attachment bolt receiving bore, wherein the reinforcing rod is positioned in the channel with an outer peripheral surface of the reinforcing rod being coupled to at least one of an inner end of the at least one flange and the second edge of one of said plates; and wherein the attachment bolt is receivable through the aperture for engagement in the attachment bolt receiving bore.

In yet another aspect, the present invention provides a vehicle steering wheel arrangement for mounting a steering column member, the arrangement comprising a vehicle cross-support member defining a plurality of longitudinally spaced mounting locations and a plurality of retention brackets welded to an associated one of the mounting locations, each said mounting location having a downwardly oriented mounting surface disposed adjacent to and above a forwardly oriented mounting surface, each said retention bracket comprising a mounting shoe and an axially extended reinforcing rod mechanically engageable by a threaded end of an attachment bolt in the securement of the steering column member to the arrangement, wherein the mounting shoe comprises: a pair of laterally spaced gusset plates, each said gusset plate extending forwardly from a respective rear edge weldable to the forwardly oriented mounting surface, and being integrally joined at respective forward portions by a forward end plate to define an open interior therebetween, wherein respective upper edges of the gusset plates and the end plate cooperatively define a partial upper rim welded to the downwardly oriented mounting surface; and a lowermost flange extending inwardly along a bottom edge portion of a first one of the gusset plates towards the second other gusset plate to define a lowermost channel therebetween; and the reinforcing rod is positioned in the lowermost channel with an outer peripheral surface of the reinforcing rod being welded to an inner end of the lowermost flange and a bottom edge of the second gusset plate, the reinforcing rod extending past a lower edge of the forward end plate in abutting contact therewith, wherein the reinforcing rod comprises at least one elongated reinforcement portion and a threaded bore portion, the at least one reinforcement portion defining a generally hollow interior, and comprising external and internal cross sections independently selected from the group consisting of a circle, an ellipse, a square, a rectangle, a hexagon and an octagon; and the threaded bore portion defining an internally threaded bore; wherein the threaded end of the attachment bolt is receivable through the aperture for complementary mated engagement with the internally threaded bore.

Preferably, the arrangement comprises two said retention brackets for mounting the steering column member therebetween, and wherein the lowermost flange of each said retention bracket extends inwardly towards the other retention bracket. In an alternative embodiment, the lowermost flange of each retention bracket extends outwardly away from the other retention bracket. In a further alternative embodiment, the lowermost flange of a first one of the retention brackets extends inwardly towards the second other retention bracket, and the lowermost flange of the second other retention bracket extends outwardly away from the first retention bracket.

In one embodiment, the first and second mounting surfaces comprise generally horizontally and vertically oriented mounting surfaces, respectively. In an alternative embodiment, the first and second mounting surfaces comprise generally vertically and horizontally oriented mounting surfaces, respectively.

The attachment bolt most preferably comprises a threaded end and the attachment bolt receiving bore comprises an internally threaded bore for complementary mated engagement with the threaded end. The internally threaded bore preferably comprises a thread length of about 5 threads to 10 threads, and most preferably 7 threads, where heat treatment may not be necessary when preparing the reinforcing rod.

In one embodiment, the mounting shoe comprises two said flanges extending inwardly from respective second edges of the plates to define the rod receiving channel therebetween, and wherein the outer peripheral surface is coupled to respective inner ends of the flanges.

In one embodiment, the plates are oriented in a generally parallel relationship with each other. In an alternative embodiment, the plates are provided in a non-parallel orientation to each other. It is to be appreciated that the plates are not limited or intended to limited as having equal or similar dimensions or configurations, and may vary for example to accommodate differing orientations and dimensions of the mounting surfaces.

The reinforcing rod preferably further comprises on a rearward axial end a rearward facing shoulder integrally joined to a generally hollow cylindrical portion, the cylindrical portion being sized for insertion at least partially in the aperture with the shoulder seated around a circumferential edge of the aperture, and wherein the threaded bore portion extends towards the rearward axial end and through the cylindrical portion.

Similarly, in a preferred embodiment, the reinforcing rod further comprises on an axial end a shoulder integrally joined to a generally hollow cylindrical portion, the cylindrical portion being sized for insertion at least partially in the aperture with the shoulder seated around a circumferential edge of the aperture, and wherein the bolt engagement portion extends towards the axial end and through the cylindrical portion.

Most preferably, the cylindrical portion is axially aligned with the reinforcement portion. The shoulder is most preferably weldable to the circumferential edge of the aperture in the seated arrangement. In an alternative embodiment, the reinforcing rod is provided without the shoulder or the cylindrical portion, and the axial end or the rearward axial end is weldable to the circumferential edge of the aperture.

The location of the threaded bore portion or bolt engagement portion in the reinforcing rod is not particularly limited. The threaded bore portion or bolt engagement portion may be disposed in the reinforcing rod on or adjacent to an axial end, or a rearward or forward axial end, or between the axial ends.

The elongated reinforcement portion preferably defines a generally hollow interior, and comprises external and internal cross sections independently selected from the group consisting of a circle, an ellipse, a square, a rectangle, a hexagon and an octagon. The reinforcing rod most preferably comprises a reinforcing cylinder defining a generally hollow interior extending between the two axial ends, and which includes substantially circular external and internal cross sections. It is to be appreciated that the external and internal cross sections are not restricted to the aforementioned preferred shapes, and may furthermore be selected from other known geometric or combinations of geometric shapes, such as oval, parallelogram, trapezoid, triangle, rhombus, pentagon, heptagon, nonagon, decagon and others.

Preferably, the forward end plate of the mounting shoe is angled rearwardly towards a lower edge of the forward end plate, and the reinforcing rod extends past the lower edge in abutting contact therewith or to provide a weldable interface, such that improved load distribution may be obtained. Respective upper edges of the gusset plates and the forward end plate most preferably cooperatively define a partial upper rim shaped for substantially abutting contact with the downwardly oriented mounting surface.

Preferably, a longitudinal axis of the reinforcing rod is positionable in a substantially normal orientation to the forwardly oriented mounting surface or the second mounting surface. Alternatively, the reinforcing rod may be positionable at an angled, non-perpendicular orientation to the forwardly oriented mounting surface or the second mounting surface.

Most preferably, the mounting shoe and the reinforcing rod are welded together to form a single pre-formed integral unit. The welding method for forming the integral retention bracket unit is not particular limited, as long as the method operates to couple the mounting shoe and the reinforcing rod. Such welding methods may include but not limited to electric resistance welding, shielded metal arc welding, gas metal arc welding, submerged arc welding, flux-cored arc welding, electroslag welding, laser beam welding, electron beam welding, electromagnetic pulse welding, friction stir welding, cold metal transfer welding and any other welding processes known in the relevant arts.

In an alternative embodiment, the mounting shoe and the reinforcing rod may be assembled using other known joining methods including but not limited to bonding, crimping, clinching, riveting and screwing.

The materials for preparing the individual components of the retention bracket are not particularly limited. Possible materials include steel, aluminum, iron, magnesium, carbon fiber, high strength polymers or plastics and any combinations or alloys thereof. In a most preferred embodiment, the reinforcing rod comprises a cold-formed or raw-formed steel having a steel grade between about AISI 1008 and about AISI 1018, or most preferably about AISI 1010. For ease and reduce cost of manufacturing, the mounting shoe may be prepared as a machine stamped component or by die casting.

The forwardly oriented mounting surface or the second mounting surface are not particularly limited, and may be defined by the steering column member or the first object, or a structural component thereof included for effecting engagement with the retention bracket. In a most preferred embodiment, the mounting location further includes a rearwardly oriented mounting surface, and the retention bracket is for use with a mounting plate, the mounting plate comprising a forward attachment surface having generally planar upper and lower portions, wherein the lower portion defines the forwardly oriented mounting surface, and wherein in a mounted arrangement the upper portion is attachable to at least part of the rearwardly oriented mounting surface, and the lower portion is positionable in substantially abutting contact with at least one of said rear edges of the gusset plates and the reinforcing rod.

Similarly, in a most preferred embodiment, the retention bracket is for use with a mounting plate having first and second surface portions, the second surface portion defining the second mounting surface, wherein in a mounted arrangement the first portion is attachable to the second object adjacent to the first mounting surface.

Furthermore, in a most preferred embodiment, each said mounting location further includes a rearwardly oriented mounting surface, and the retention bracket is for use with a mounting plate, the mounting plate comprising a forward attachment surface having generally planar upper and lower portions, wherein the lower portion defines the forwardly oriented mounting surface, and wherein in a mounted arrangement the upper portion is attachable to at least part of the rearwardly oriented mounting surface.

Additional and alternative features of the present invention will be apparent to a person skilled in the art from the following detailed description of the preferred embodiments thereof.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
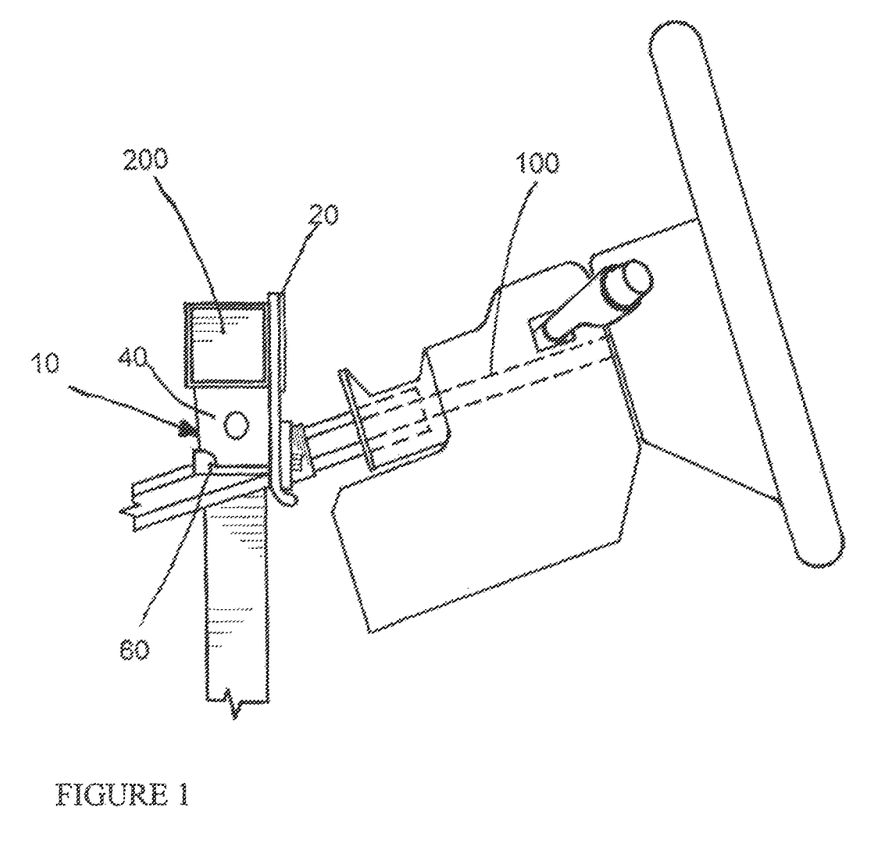
FIG. 1 is a side view of a retention bracket in accordance with a preferred embodiment of the present invention, and which is shown in use with a vertically oriented coupling plate for coupling a vehicle steering column member to a vehicle cross-support member.

Reference is made to FIG. 1 which shows a side view of a retention bracket 10 for use with a vertically oriented coupling plate 20 in coupling a vehicle steering column member 100 to a vehicle cross-support member 200 in accordance with a preferred embodiment of the present invention. As will be described, the retention bracket 10 includes a load bearing mounting shoe 40 and an elongated fastening cylinder 60. For greater clarity, FIG. 2 separately illustrates a fully assembled retention bracket 10 in which the shoe 40 and the cylinder 60 are welded together with the coupling plate 20 to form a single integral unit.

Figure 3:
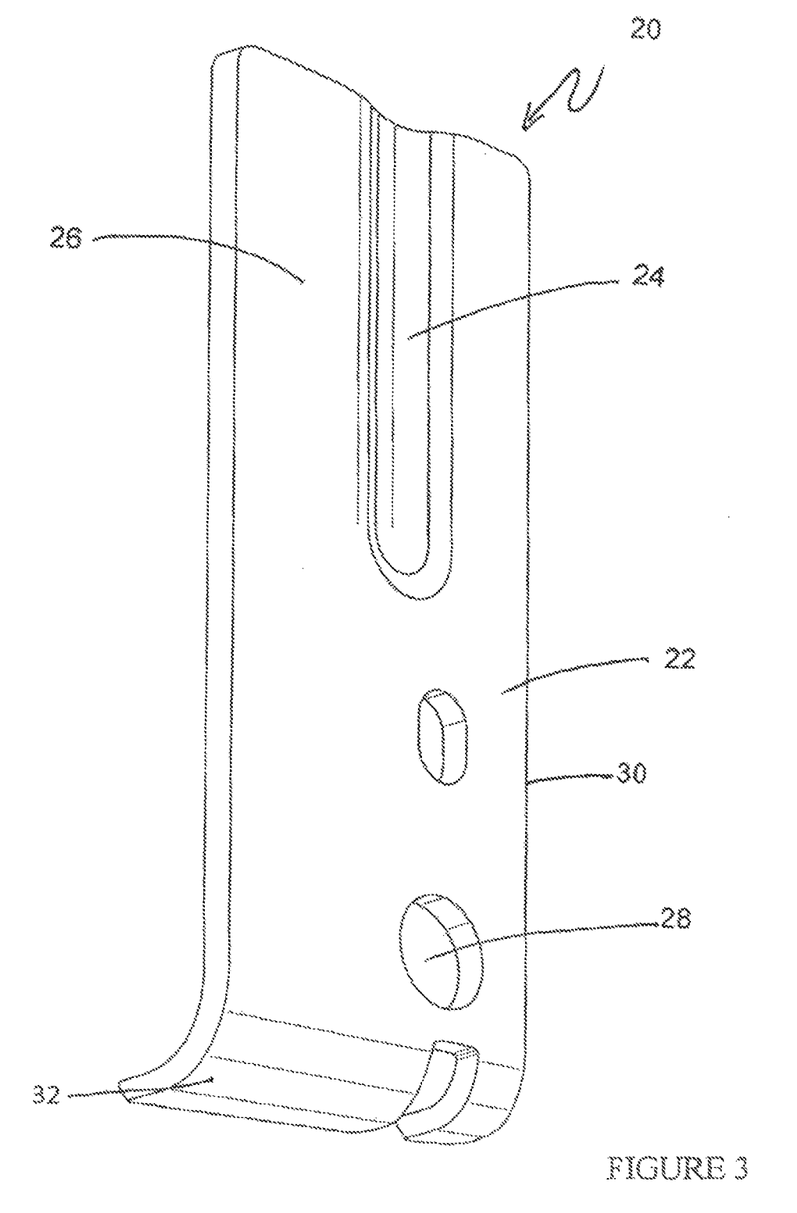
FIG. 3 is a perspective view of the vertically oriented coupling plate shown in FIG. 1.

As seen in FIG. 3, the coupling plate 20 has a generally rectangular backing portion 22 which is formed having a generally planar configuration along its lower portion, and which may have formed therein one or more stamped reinforcing ribs 24 for improved structural rigidity. The backing portion 22 defines a forwardly oriented weldable surface 26 and a rearward steering column mounting surface (not shown) opposed to the weldable surface 26. The backing portion 22 further defines in the lower portion an aperture 28 offset towards a lateral edge 30, and which extends between the weldable surface 26 and the opposed rearward surface. A rearwardly projecting cradling lip 32 is integrally formed at a bottom edge of the coupling plate 20.

Although not strictly limited, the coupling plate 20 preferably extends vertically between about 5 cm and about 15 cm in length and between about 2 cm and about 7 cm in width, and more preferably between about 7 cm and about 12 cm in length and between about 3 cm and about 5 cm in width. The coupling plate 20 preferably has a thickness between about 0.1 cm and 1 cm.

Figure 4:
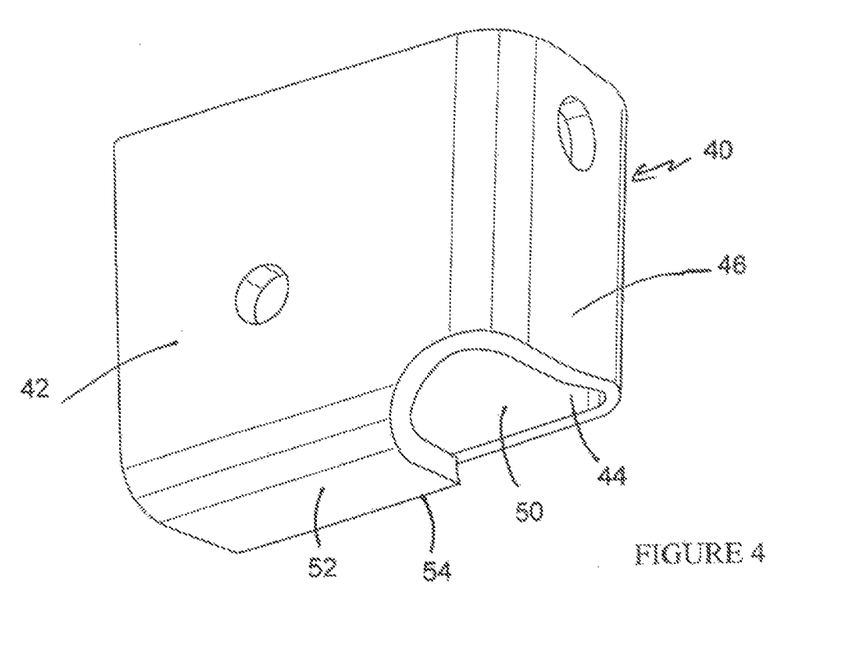
FIG. 4 is a perspective view of a load bearing mounting shoe of the retention bracket shown in FIG. 1.
Figure 5:
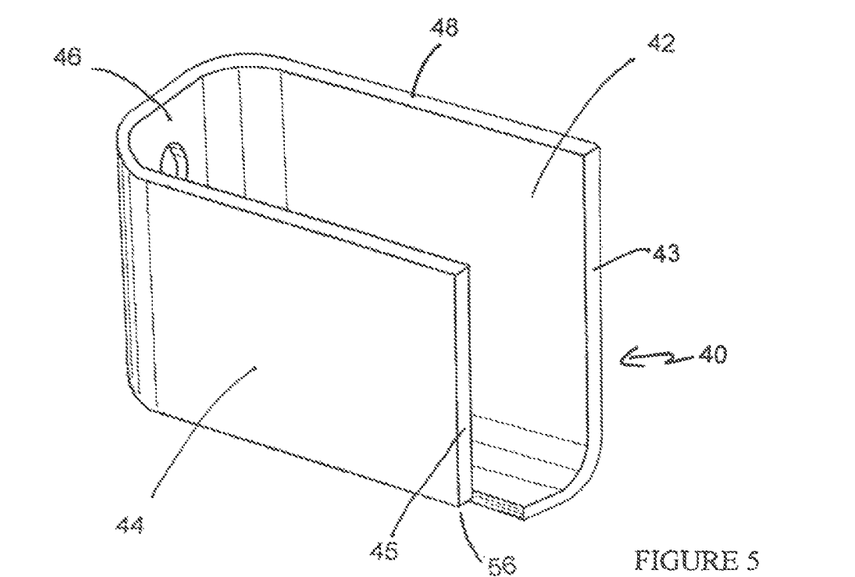
FIG. 5 is another perspective view of the mounting shoe shown in FIG. 4.

Reference is made to FIG. 4 which shows a perspective view of the load bearing mounting shoe 40. The mounting shoe 40 is formed from a single stamped metal piece, and most preferably is comprised of cold-formed or raw-formed steel. The mounting shoe 40 includes a pair of generally parallel gusset plates 42, 44 each extending forwardly between about 2 cm and about 7 cm from their respective rear edges 43, 45 (shown in FIG. 5). The gusset plates 42, 44 are laterally spaced between about 1 cm and 6 cm, and are integrally merged at their forward edges with a transverse forward end plate 46. The forward end plate 46 is angled forwardly towards an upper edge at an inclination angle selected at between about 2° and 20°, and preferably at about 5°, such that with the retention bracket 10 mated to the cross-support member 200, the end plate 46 extends further forwardly on the cross-support member 200 than on the fastening cylinder 60. The respective upper edges of the gusset plates 42, 44 and the forward end plate 46 cooperatively define a generally planar, continuous U-shaped upper rim 48.

The gusset plates 42, 44 and the forward end plate 46 further cooperatively define an open interior 50. The gusset plate 42 includes a lowermost flange 52 extending along a lower portion thereof, so as to project inwardly between about 0.5 cm and about 4 cm towards the open interior 50 and the gusset plate 44, to an inner end 54. The inner end 54 does not fully extend to contact the gusset plate 44, such that a cylinder receiving channel 56 is defined therebetween.

In an alternative embodiment, the gusset plate 44 includes the lowermost flange 52 extending along its lower portion, and projecting inwardly towards the open interior 50 and the gusset plate 42.

Figure 6:
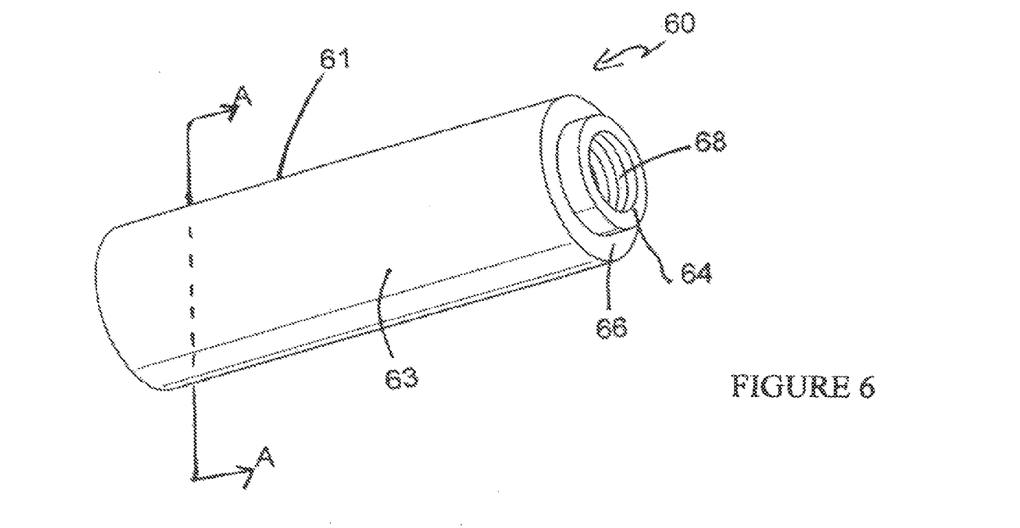
FIG. 6 is a perspective view of an elongated fastening cylinder of the retention bracket shown in FIG. 1.
Figure 7:
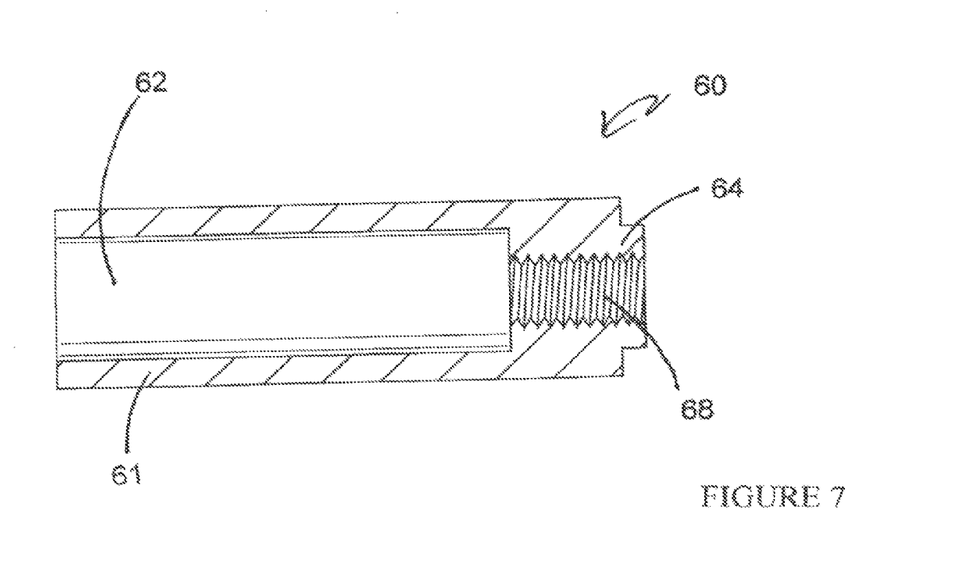
FIG. 7 is a cross-section view of the elongated fastening cylinder taken along the line A-A as shown in FIG. 6.

Reference is made to FIG. 6 which illustrates a perspective view of the elongated fastening cylinder 60 in accordance with a preferred embodiment of the present invention. The fastening cylinder 60 includes a cylindrical body 61 defining an axially extended hollow interior 62 and an outer peripheral surface 63 which is circular in cross section normal to the axis of the cylinder 60. The cylindrical body 61 includes at an axial end a reduced diameter portion 64 integrally joined thereto with a shoulder 66. As best seen in FIG. 7, the rearward end of the cylindrical body 61 and the reduced diameter portion 64 define an internally threaded bore surface 68 which extends axially to open to a rearward end of the reduced diameter portion 64. The cylindrical body 61 preferably extends axially between about 3 cm and about 10 cm from the shoulder 66. The outer diameter of the out peripheral surface 63 is preferably between about 1 cm and about 4 cm, and larger than that of the reduced diameter portion 64 which is preferably between about 0.5 cm and about 2.5 cm. The reduced diameter portion 64 preferably extends rearwardly between about 0.1 cm and about 0.5 cm.

For assembly, the reduced diameter portion 64 of the fastening cylinder 60 is inserted into the aperture 28 of the coupling plate 20, such that the shoulder 66 is seated around a circumferential edge of the aperture 28. With the reduced diameter portion 64 received in the aperture 28, the fastening cylinder 60 is secured to the weldable surface 26 by weldments extending circumferentially about the outermost circumference of the shoulder 66. With the upper rim 48 oriented upwardly, the rear edges 43, 45 of the gusset plates 42, 44 are positioned in juxtaposition with the weldable surface 26, such that the rear edges 43, 45 are aligned generally parallel to the lateral edge 30, and the inner end 54 of the lowermost flange 52 and the bottom edge of the gusset plate 44 are adjacent to or in physical contact with the outer peripheral surface 63. Once the fastening cylinder 60 is oriented in position within the cylinder receiving channel 56 as such, to complete assembly the rear edges 43, 45 are then welded to the weldable surface 26 and the outer peripheral surface 63 to the inner end 54 and the bottom edge of the gusset plate 44.

Figure 2:
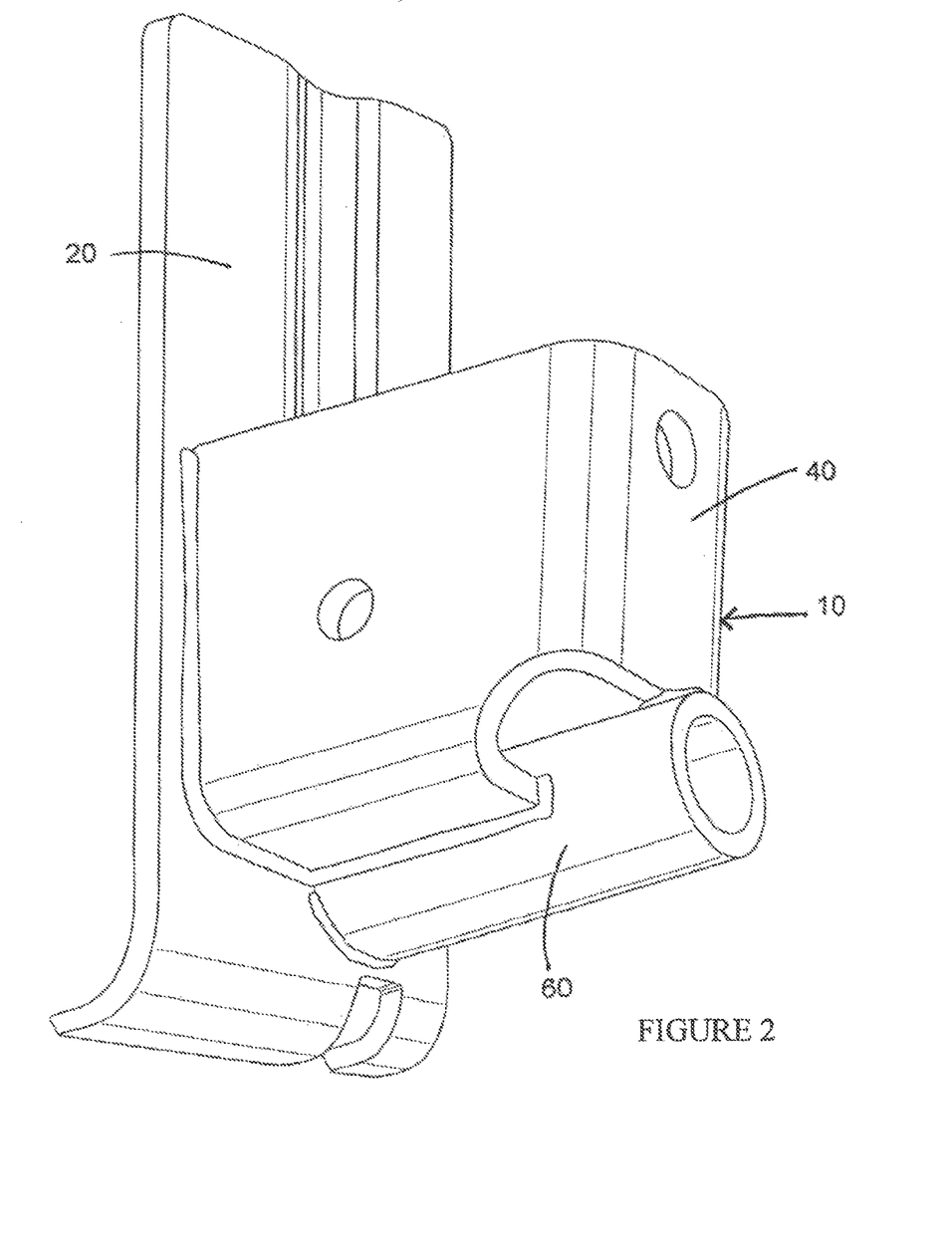
FIG. 2 is a perspective view of the retention bracket and the coupling plate shown in FIG. 1.

As shown in FIGS. 1 and 2, the fastening cylinder 60 extends past a lower edge of the forward end plate 46, so as to provide an additional weldable interface or abutting contact between the fastening cylinder 60 and the mounting shoe 40 for improved load distribution. Furthermore, in the fully assembled form the reduced diameter portion 64 does not protrude past the rearward mounting surface (best shown in FIG. 9), such that the rearward surface is maintained as a generally planar surface.

It is to be appreciated that a person skilled in the art would readily appreciate other possible ways of preparing or assembling the retention bracket 10. For example, the fastening cylinder 60 may be welded to the mounting shoe 40 first to form the retention bracket 30, and the retention bracket 30 can then be welded to the coupling plate 20. Alternatively, the mounting shoe 40 may be welded to the coupling plate 20 first, followed by welding of the fastening cylinder 60 to the coupling plate 20 and the mounting shoe 40.

Figure 8:
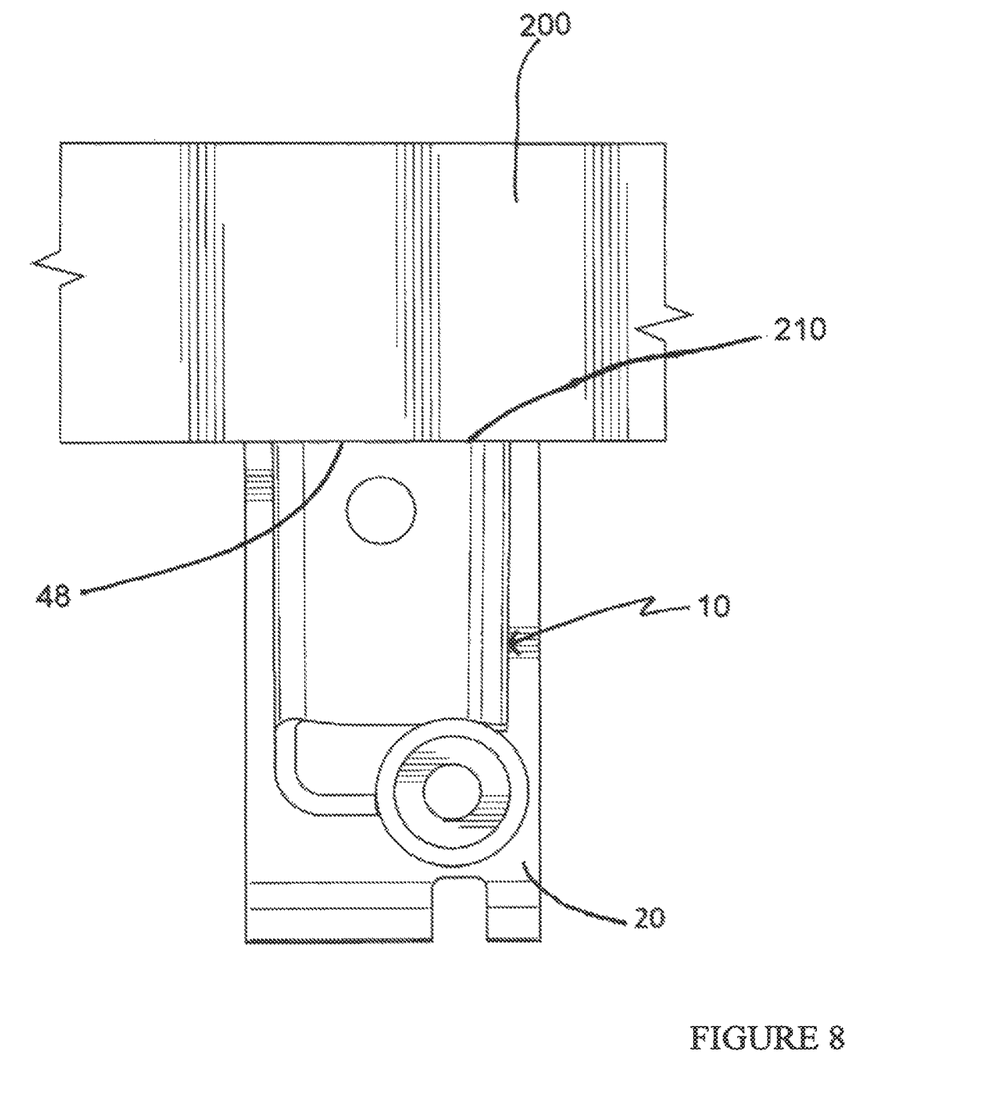
FIG. 8 is a front view of the retention bracket and the coupling plate shown in FIG. 1, and which are welded to a vehicle cross-support member.

In operation, to mount the steering column member 100 in an automobile, the fully assembled retention bracket 10, together with the coupling plate 20 are welded to the vehicle cross-support member 200 at a mounting location having a rearwardly oriented mounting surface (not shown) and a downwardly oriented mounting surfaces 210 as seen in FIG. 8. In particular, an upper portion of the weldable surface 26 of the coupling plate 20 is welded to the rearwardly oriented mounting surface, and the upper rim 48 of the mounting shoe 40 to the downwardly oriented mounting surface 210. When welded to the mounting location, the internally threaded bore surface 68 of the fastening cylinder 60 is in position to receive an externally threaded end of an attachment bolt in securing the steering column member 100 thereto.

It has been appreciated that the combination of the mounting shoe 40 and the fastening cylinder 60 of the invention may provide for improved load distribution and NVH performance of the steering column member 100 mounted with the retention bracket 10.

Figure 9:
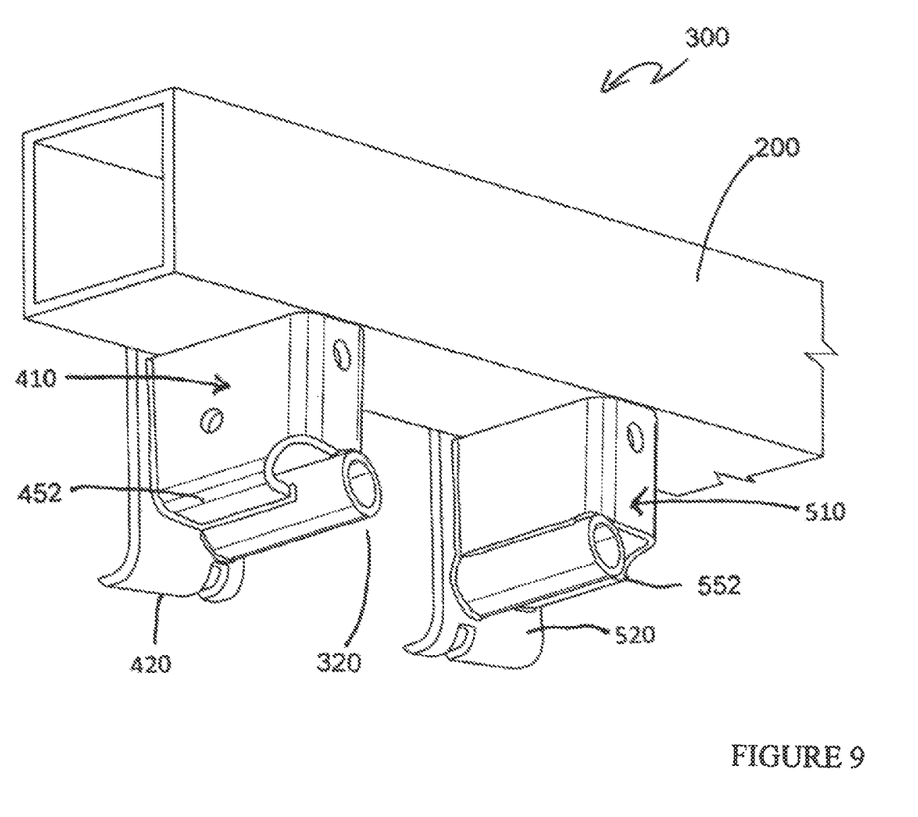
FIG. 9 is a perspective view of a vehicle steering wheel arrangement having a pair of retention brackets in use with associated vertically oriented coupling plates, and which are welded to a vehicle cross-support member in accordance with a preferred embodiment of the present invention.
Figure 10:
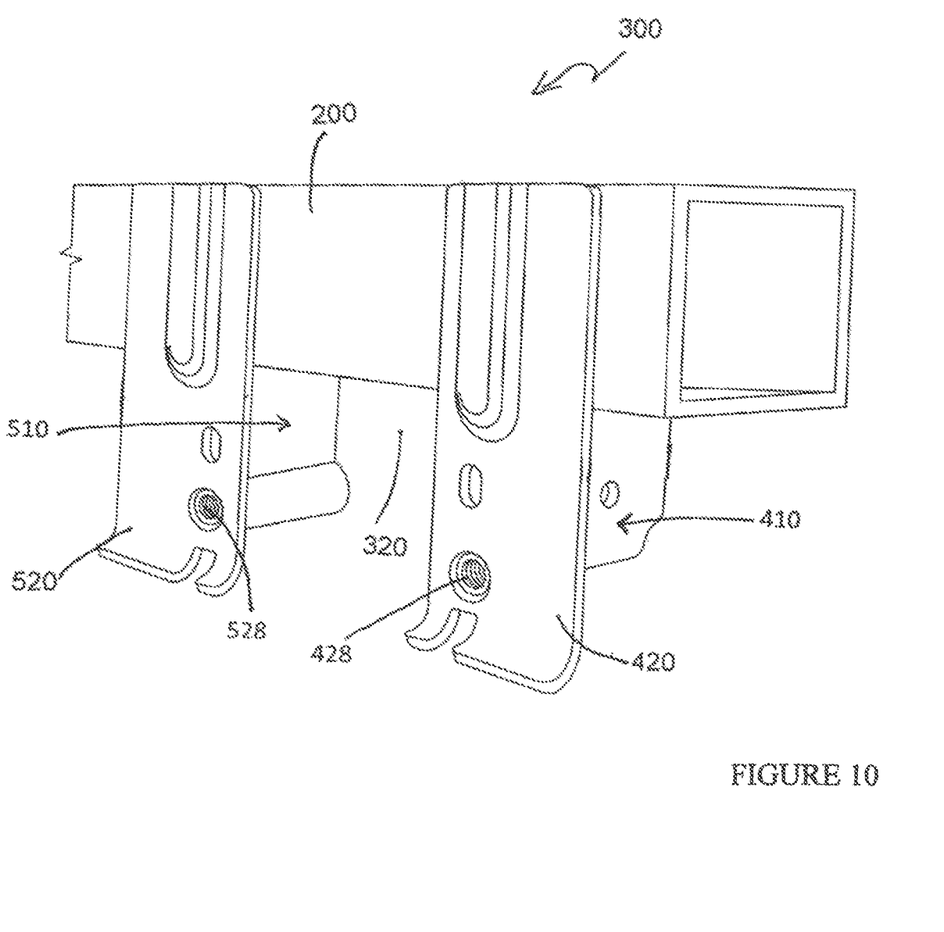
FIG. 10 is another perspective view of the preferred vehicle steering wheel arrangement shown in FIG. 9.

Reference is made to FIG. 9 which shows a perspective view of a preferred vehicle steering wheel mounting arrangement 300 which includes the vehicle cross-support member 200 and a pair of longitudinally spaced retention brackets 410, 510 and associated vertically oriented coupling plates 420, 520 welded to the cross-support member 200. As seen in FIG. 10, respective apertures 428, 528 defined by the coupling plates 420, 520 are offset towards a center steering column mounting area 320, such that respective lowermost flanges 452, 552 extend inwardly towards the same. It has been appreciated that such arrangement of the retention brackets 410, 510, and the inwardly extending lowermost flanges 452, 552 may provide for further improved load distribution and NVH performance.

It is to be appreciated that although the retention bracket 10, 410, 510 has been described with respect to a most preferred use with the coupling plate 20, 420, 520 in mounting the steering column member 100 to the vehicle cross-support member 200, the retention bracket 10, 410, 510 is not or intended to be limited solely to such use. In particular, the retention bracket 10, 410, 510 could also permit uses in mounting or coupling other mechanical components or objects at a mounting location with an attachment bolt, where the mounting location most preferably includes a generally planar mounting surface oriented at an angle to another mounting surface. Furthermore, it is to be appreciated that the retention bracket 10, 410, 510 does not necessarily require the preferred mounting orientations illustrated in FIGS. 1, 9 and 10. Specifically, in alternative embodiments, the reinforcing cylinder may be oriented vertically, horizontally or at any other angles therebetween when welded or secured at a mounting location.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A retention bracket for coupling a steering column member to a vehicle cross-support member, the cross-support member defining a mounting location having a downwardly oriented mounting surface disposed adjacent to and above a forwardly oriented mounting surface, the forwardly oriented mounting surface defining an aperture,
the retention bracket comprising a mounting shoe and an axially extended reinforcing rod mechanically engageable by a threaded end of an attachment bolt in the securement of the steering column member to the retention bracket, wherein
the mounting shoe comprises:
a pair of laterally spaced gusset plates, each said gusset plate extending forwardly from a respective rear edge, and being integrally joined at respective forward portions by a forward end plate to define an open interior therebetween, wherein an upper edge of at least one of the gusset plates and the forward end plate is positionable in substantially abutting contact with the downwardly oriented mounting surface, and at least one of the rear edges is positionable in substantially abutting contact with the forwardly oriented mounting surface; and a lowermost flange extending inwardly along a bottom edge portion of a first one of the gusset plates towards the second other gusset plate to define a lowermost channel therebetween; and
the reinforcing rod comprises at least one elongated reinforcement portion and a threaded bore portion, the threaded bore portion defining an internally threaded bore, wherein the reinforcing rod is positioned in the lowermost channel with an outer peripheral surface of the reinforcing rod being coupled to an inner end of the lowermost flange and a bottom edge of the second gusset plate; and
wherein the threaded end of the attachment bolt is receivable through the aperture for complementary mated engagement with the internally threaded bore.

2. The retention bracket of claim 1, wherein respective upper edges of the gusset plates and the forward end plate cooperatively define a partial upper rim shaped for substantially abutting contact with the downwardly oriented mounting surface.

3. The retention bracket of claim 1, wherein the reinforcing rod further comprises on a rearward axial end a rearward facing shoulder integrally joined to a generally hollow cylindrical portion, the cylindrical portion being sized for insertion at least partially in the aperture with the shoulder seated around a circumferential edge of the aperture, and wherein the threaded bore portion extends towards the rearward axial end and through the cylindrical portion.

4. The retention bracket of claim 1, wherein the elongated reinforcement portion defines a generally hollow interior, and comprises external and internal cross sections independently selected from the group consisting of a circle, an ellipse, a square, a rectangle, a hexagon and an octagon.

5. The retention bracket of claim 1, wherein the mounting location further includes a rearwardly oriented mounting surface, and the retention bracket is for use with a mounting plate, the mounting plate comprising a forward attachment surface having generally planar upper and lower portions, wherein the lower portion defines the forwardly oriented mounting surface, and wherein in a mounted arrangement the upper portion is attachable to at least part of the rearwardly oriented mounting surface, and the lower portion is positionable in substantially abutting contact with at least one of said rear edges of the gusset plates and the reinforcing rod.

6. The retention bracket of claim 1, wherein a longitudinal axis of the reinforcing rod is positionable in a substantially normal orientation to the forwardly oriented mounting surface.

7. The retention bracket of claim 1, wherein the forward end plate is angled rearwardly towards a lower edge of the forward end plate, and the reinforcing rod extends past the lower edge in abutting contact therewith.

8. The retention bracket of claim 1, wherein the mounting shoe and the reinforcing rod are welded together to form a single pre-formed integral unit.

9. The retention bracket of claim 1, wherein the internally threaded bore comprises a thread length of about 5 threads to about 10 threads.

10. A retention bracket for securing a first object to a second object, the second object defining a mounting location having a first generally planar mounting surface oriented at an acute, right or obtuse angle to a second generally planar mounting surface, wherein the second mounting surface defines an aperture,
the retention bracket comprising a mounting shoe and an axially extended reinforcing rod mechanically engageable by an attachment bolt in the securement of the first object to the retention bracket, wherein the mounting shoe comprises:

a pair of laterally spaced plates integrally joined along associated first ends by an end wall to define an open interior therebetween, wherein at least one of second other ends of the plates are positionable in substantially abutting contact with the second mounting surface, and at least one of first edges of the plates are positionable in substantially abutting contact with the first mounting surface; and at least one flange extending inwardly from a second other edge of a first one of the plates towards a second other edge of the second other plate to define a rod receiving channel therebetween; and the reinforcing rod comprises at least one elongated reinforcement portion and a bolt engagement portion, the bolt engagement portion defining an attachment bolt receiving bore, wherein the reinforcing rod is positioned in the channel with an outer peripheral surface of the reinforcing rod being coupled to at least one of an inner end of the at least one flange and the second edge of one of said plates; and wherein the attachment bolt is receivable through the aperture for engagement in the attachment bolt receiving bore.

11. The retention bracket of claim 10, wherein the reinforcing rod further comprises on an axial end a shoulder integrally joined to a generally hollow cylindrical portion, the cylindrical portion being sized for insertion at least partially in the aperture with the shoulder seated around a circumferential edge of the aperture, and wherein the bolt engagement portion extends towards the axial end and through the cylindrical portion.

12. The retention bracket of claim 10, wherein the elongated reinforcement portion defines a generally hollow interior, and comprises external and internal cross sections independently selected from the group consisting of a circle, an ellipse, a square, a rectangle, a hexagon and an octagon.

13. The retention bracket of claim 10, wherein the first and second mounting surfaces comprise generally horizontally and vertically oriented mounting surfaces, respectively.

14. The retention bracket of claim 10, wherein the first and second mounting surfaces comprise generally vertically and horizontally oriented mounting surfaces, respectively.

15. The retention bracket of claim 10, wherein the attachment bolt comprises a threaded end and the bore comprises an internally threaded bore for complementary mated engagement with the threaded end.

16. The retention bracket of claim 15, wherein the threaded bore comprises a thread length of about 5 to about 10 threads.

17. The retention bracket of claim 10, wherein the mounting shoe comprises two said flanges extending inwardly from respective second edges of the plates to define the rod receiving channel therebetween, and wherein the outer peripheral surface is coupled to respective inner ends of the flanges.

18. The retention bracket of claim 10, wherein the retention bracket is for use with a mounting plate having first and second surface portions, the second surface portion defining the second mounting surface, wherein in a mounted arrangement the first portion is attachable to the second object adjacent to the first mounting surface.

19. The retention bracket of claim 10, wherein the mounting shoe and the reinforcing rod are welded together to form a singled pre-formed integral unit.

20. A vehicle steering wheel arrangement for mounting a steering column member, the arrangement comprising a vehicle cross-support member defining a plurality of longitudinally spaced mounting locations and a plurality of retention brackets welded to an associated one of the mounting locations, each said mounting location having a downwardly oriented mounting surface disposed adjacent to and above a forwardly oriented mounting surface, each said retention bracket comprising a mounting shoe and an axially extended reinforcing rod mechanically engageable by a threaded end of an attachment bolt in the securement of the steering column member to the arrangement, wherein the mounting shoe comprises:

a pair of laterally spaced gusset plates, each said gusset plate extending forwardly from a respective rear edge weldable to the forwardly oriented mounting surface, and being integrally joined at respective forward portions by a forward end plate to define an open interior therebetween, wherein respective upper edges of the gusset plates and the end plate cooperatively define a partial upper rim welded to the downwardly oriented mounting surface; and a lowermost flange extending inwardly along a bottom edge portion of a first one of the gusset plates towards the second other gusset plate to define a lowermost channel therebetween; and the reinforcing rod is positioned in the lowermost channel with an outer peripheral surface of the reinforcing rod being welded to an inner end of the lowermost flange and a bottom edge of the second gusset plate, the reinforcing rod extending past a lower edge of the forward end plate in abutting contact therewith, wherein the reinforcing rod comprises at least one elongated reinforcement portion and a threaded bore portion, the at least one reinforcement portion defining a generally hollow interior, and comprising external and internal cross sections independently selected from the group consisting of a circle, an ellipse, a square, a rectangle, a hexagon and an octagon; and the threaded bore portion defining an internally threaded bore;

wherein the threaded end of the attachment bolt is receivable through the aperture for complementary mated engagement with the internally threaded bore.

21. The vehicle steering wheel arrangement of claim 20, wherein the reinforcing rod comprises a cold-formed or raw-formed steel having a steel grade between about AISI 1008 to about AISI 1018, and the internally threaded bore comprises a thread length of about 5 to about 10 threads.

22. The vehicle steering wheel arrangement of claim 20, wherein the arrangement comprises two said retention brackets for mounting the steering column member therebetween, and wherein the lowermost flange of each said retention bracket extends inwardly towards the other retention bracket.

23. The vehicle steering wheel arrangement of claim 20, wherein each said reinforcing rod further comprises on a rearward axial end a rearward facing shoulder integrally joined to a generally hollow cylindrical portion, the cylindrical portion being sized for insertion at least partially in the aperture with the shoulder welded in a seated arrangement around a circumferential edge of the aperture, and wherein the threaded bore portion extends towards the rearward axial end and through the cylindrical portion.

24. The vehicle steering wheel arrangement of claim 20, wherein each said mounting location further includes a rearwardly oriented mounting surface, and the retention bracket is for use with a mounting plate, the mounting plate comprising a forward attachment surface having generally planar upper and lower portions, wherein the lower portion defines the forwardly oriented mounting surface, and wherein in a mounted arrangement the upper portion is attachable to at least part of the rearwardly oriented mounting surface.

* * * * *